Aug. 26, 1952 — C. W. PETERSÉN — 2,608,144
FOCAL PLANE SHUTTER FOR CAMERAS
Filed July 3, 1950 — 3 Sheets-Sheet 1
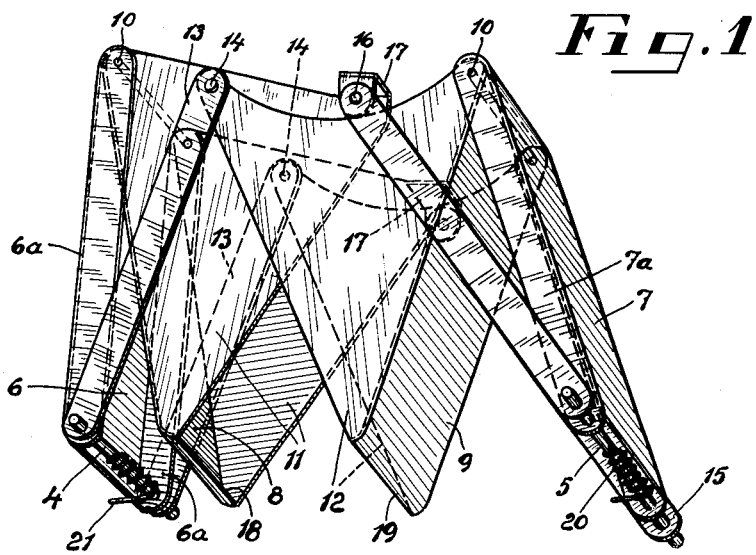
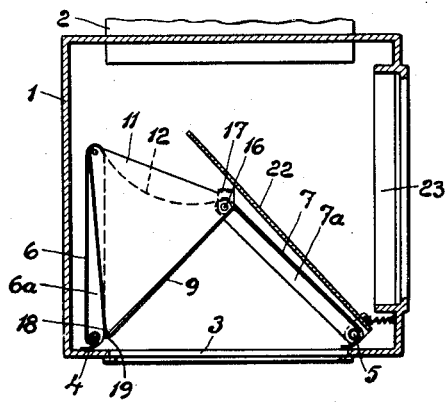
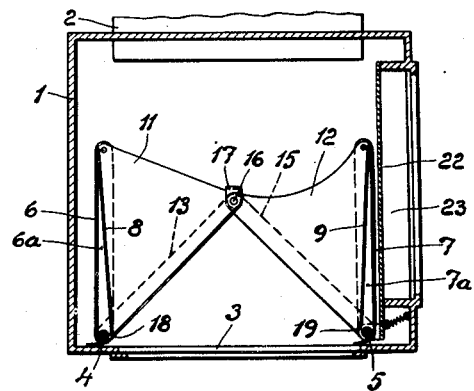
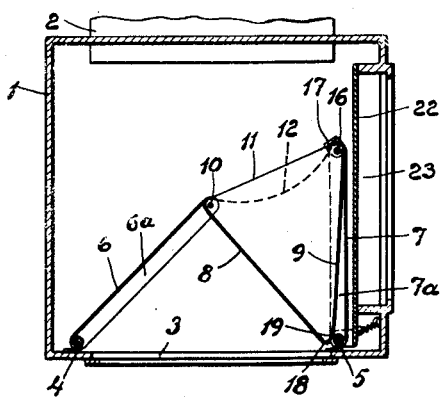
INVENTOR.
CURT WILHELM PETERSÉN
BY
Linton and Linton
ATTORNEYS

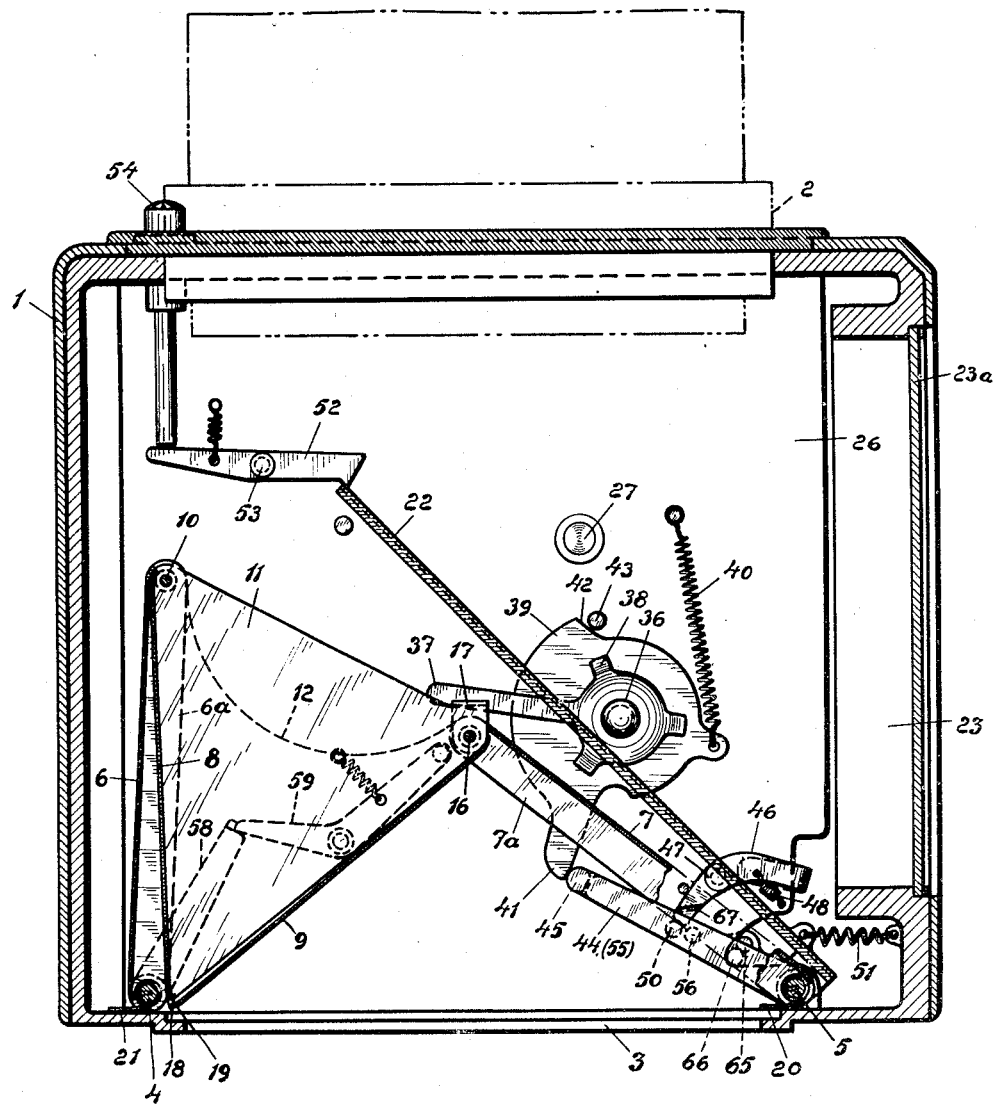

Aug. 26, 1952 — C. W. PETERSÉN — 2,608,144
FOCAL PLANE SHUTTER FOR CAMERAS
Filed July 3, 1950 — 3 Sheets-Sheet 3

INVENTOR.
CURT WILHELM PETERSÉN
BY
Linton and Linton
ATTORNEYS

Patented Aug. 26, 1952

2,608,144

UNITED STATES PATENT OFFICE 2,608,144

FOCAL PLANE SHUTTER FOR CAMERAS

Curt Wilhelm Petersén, Huskvarna, Sweden, assignor to Fritz Victor Hasselblad, Gothenburg, Sweden Application July 3, 1950, Serial No. 171,949
In Sweden August 11, 1948

1 Claim. (Cl. 95—58)

The present invention relates to focal plane shutters for cameras by means of which an emulsion is exposed to light through a slit which moves over a path parallel to the emulsion surface and at a short distance therefrom.

An object of the present invention is to provide an improved shutter of the kind referred to which is simple in construction and efficient in use.

An embodiment of the invention is shown by way of example in the accompanying drawings, wherein Figure 1 is a perspective view of the shutter;

Figure 2 is a diagrammatic sectional view of a camera with the shutter in set position;

Figure 3 is a similar view with the shutter in open position;

Figure 4 is a similar view with the shutter in unset position;

Figure 5 is a section on a larger scale through the camera with the shutter in set position;

Like numerals of reference indicate like parts throughout the several views.

Figure 6:
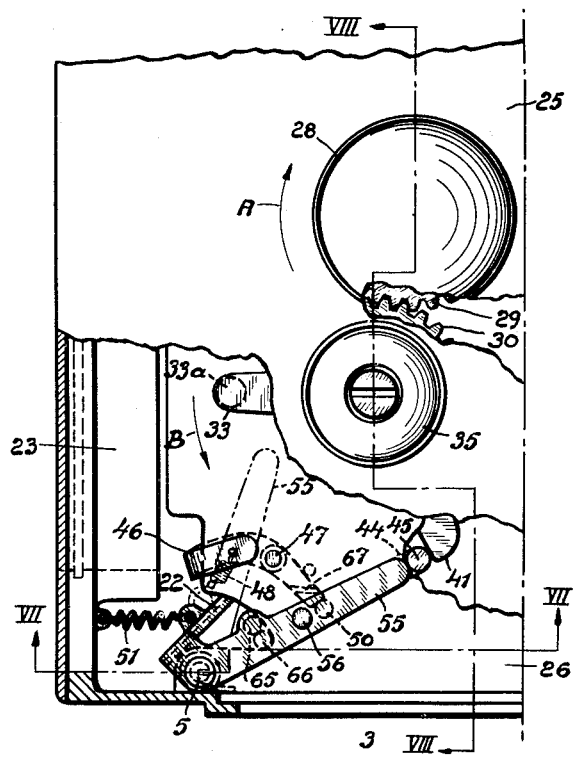
Figure 6 is a side elevation of a part of the camera with portions broken away.
Figure 8:
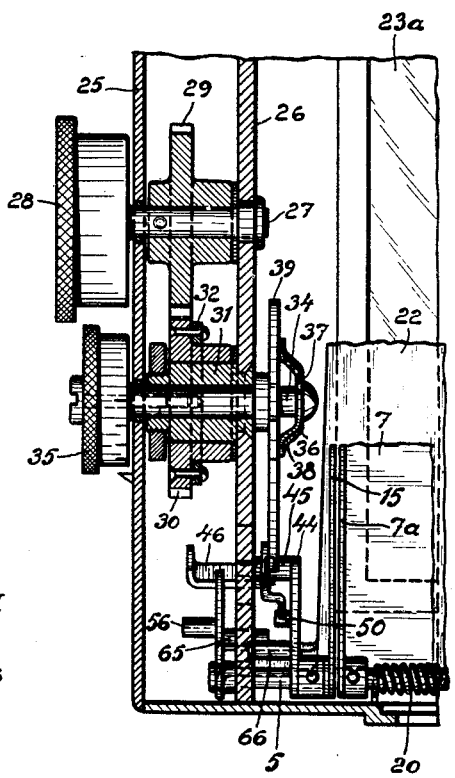
Figure 8 is a section on the line VIII—VIII in Figure 6.

Referring first particularly to Figures 1–4, I designates a camera box of rectangular form having at one wall the lens holder 2 and at the opposite wall a rectangular light opening 3 behind which the emulsion surface (the film) is disposed in the focal plane of the camera. Adjacent two opposite sides of said light opening 3 and parallel thereto there are provided in the box two rotationally mounted shafts 4 and 5, respectively. On each of said shafts there is secured a rectangular, rigid plate 6 and 7, respectively, which may be swung from a position substantially perpendicular to the focal plane towards the optical axis of the camera to occupy a position forming about 45° to the focal plane. Each plate 6, 7 is provided with side flanges 6a and 7a, respectively, forming right angles with the plates. To the free end of each plate 6, 7 a rectangular, rigid shutter plate 8 and 9, respectively, is hingedly connected by means of a pin 10, each shutter plate being provided with side pieces 11 and 12, respectively, of triangular shape and perpendicular to the shutter plates 8, 9 as well as to the focal plane. Guiding links 13 are pivoted on the shaft 4 and, at 14, hingedly connected to the free point of the side pieces 12 of the shutter plate 9, and similar guiding links 15 are pivoted on the shaft 5 and, at 16, hingedly connected to U-shaped lugs 17 projecting sideways from the free points of the side pieces 11 of the shutter plate 8.

In the unset position (Figure 4) the guiding plate 7 occupies a position substantially perpendicular to the focal plane with its shutter plate 9 folded down between the flanges 7a. The guiding plate 6 occupies a position forming substantially 45° to the focal plane and its shutter plate 8 occupies a position substantially perpendicular to the guiding plate 6 with its free edge 18 close to the free edge 19 of the shutter plate 9. In this position of the plates the guiding plate 6 and the shutter plate 8 form together a light-obscuring wall which extends across the box. When setting the shutter the guiding plate 7 is swung to a position forming about 45° with the focal plane by means of a setting mechanism described below and against the action of a spring 20 coiled around the shaft 5, and during this movement of the guiding plate 7 the shutter plate 9 guided by the guiding links 13 is swung to a position perpendicular to the guiding plate 7, whereby the free edge 19 of said shutter plate 9 follows a path parallel to and adjacent the focal plane across the light opening 3. During its said movement the free edge 19 pushes the free edge 18 of the shutter plate 8 along the same path, thus swinging the last mentioned shutter plate 8 and, against the action of a spring 21 coiled around the shaft 4, its guiding plate 6 to a position substantially perpendicular to the focal plane. The shutter is now set and the guiding plate 7 forms together with the shutter plate 9 a light-obscuring wall which extends across the box. As the guiding plate 7 is released by means of a suitable release mechanism, it is swung to a position substantially perpendicular to the focal plane under the action of the spring 20, whereby the free edge 19 of the shutter plate 9 due to the action of the guiding links is moved across the light opening 3 following a path substantially parallel and adjacent to the focal plane, and occupies finally a position near the shaft 5, thus exposing the light opening 3 to the light from the lens system. As the guiding plate 6 is released it is swung to a position forming about 45° to the focal plane under the action of the spring 21, and under this swinging movement of said plate 6 the free edge 18 of the shutter plate 8 is moved across the light opening by means of the guiding links 15 following the path of the free edge 19 of the shutter plate 9, until it contacts said edge 19, and in this position of the shutter the guiding plate 6 forms together with the shutter plate 8 a light-obscuring wall which extends across the box. By timing the release of the guiding plate 6 with respect to the release of the guiding plate 7 the edges 18 and 19 can be allowed to move simultaneously across the light opening at a suitable distance from each other, in which case the emulsion (film) is exposed through the slit formed between said edges and passing across the light opening. The camera shown in the drawings is of mirror reflex type, and from Figures 2–4 it is seen how a mirror 22 is pivotally mounted on the shaft 5 and swingable between a position (Figures 3 and 4) in which it closes an opening 23 for a focussing screen, and a position (Figure 2) in which it reflects the light from the lens system towards the focussing screen.

A form of operating mechanism will now be described with particular reference to Figures 5-8 of the accompanying drawings.

Figure 7:
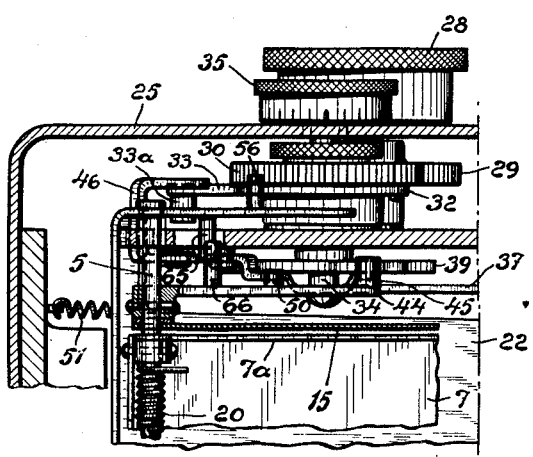
Figure 7 is a section on the line VII—VII in Figure 6.

Near one, 25, of the walls of the box 1 there is provided within the box a partition wall 26 and in said walls there is journalled a shaft 27 operable by a setting knob 28. Pinned to said shaft 27 there is a toothed wheel 29 meshing with a toothed wheel 30 rotationally mounted on a hub 31 secured between the walls 25 and 26, and to the toothed wheel 30 there is secured a ring 32 having a radially projecting arm 33 with a sideways projecting pin 33a at its free end (Figures 6 and 7). Through the hub 31 passes a spindle 34 provided at its outer end with a knob 35 and at its inner end with a cup-shaped disc 36 with a radially projecting arm 37 and three resilient fingers 38 frictioning on a disc 39, which is rotationally mounted on the shaft 34 and is actuated by a spring 40. The disc 39 is formed with a radially projecting arm 41 and a step 42 which in co-operation with a pin 43 secured to the partition wall 26 prevents a rotation of the disc 39 in a clock-wise direction according to Figure 5, as the disc occupies the position shown in said figure. To the shaft 5 on which the guiding plate 7 is secured there is secured adjacent to the inner side of the partition wall 26 a radially projecting arm 44 provided at its free end with a sideways projecting pin 45, against which the arm 41 of the disc 39 is held by the spring 40. The shutter is retained in set position (Figure 5) by a U-shaped pawl 46 swingably mounted on a pivot 47 and actuated by a spring 48 tending to rotate the pawl in a clock-wise direction according to Figure 5 (anti-clock-wise according to Figure 6). Against the free end of that branch of the pawl 46 which is located at the inner side of the partition wall 26, rests in set position of the shutter another pin 50 secured to the arm 44 thus retaining the arm 44 and consequently the guiding plate 7 in said position. The mirror 22, which is freely pivotable on the shaft 5, is actuated by a spring 51, tending to swing the mirror 22 towards the focussing screen 23a. In set position of the shutter the mirror is retained in operative position by a spring-actuated pawl 52, swingable on a pin 53 and operable by means of a push button 54. An arm 55 disposed radially in relation to the shaft 5 is secured to the mirror 22 and provided with a sideways projecting pin 56, in the path of movement of which, as the mirror swings towards the focussing screen 23a after having been released by the pawl 52, the other branch of the U-shaped pawl 46 is situated. As this pin 56 contacts said branch the U-shaped pawl 46 is swung against the action of the spring 48 to a position in which the arm 44 secured to the guiding plate 7 is released, so that said guiding plate 7 is free to swing to the position shown in Figures 3 and 4. The disc 39 which is no longer retained by the arm 44 is now free to rotate under the action of the spring 40 and, due to the friction between said disc and the fingers 38 of the cup-shaped disc 36, the last-mentioned disc follows the disc 39 in its rotation. The other guiding plate 6 is secured to the rotationally mounted shaft 4 and to said shaft there is also secured a radially projecting arm 58 (Figure 5). A double-armed spring-actuated pawl 59 is provided for retaining said arm 58 and consequently said guiding plate 6 in set position. This pawl 59 is caused to release the arm 58 and consequently the guiding plate 6 by the arm 37 projecting from the cup-shaped disc 36 when the disc 39 after having been released as described above has rotated through a certain angle, the size of which depends on the angular adjustment of said arm 37 in relation to the disc 39.

When setting the shutter the knob 35 is rotated 360° in the direction of the arrow A in Figure 6, whereby the toothed wheel 30 is rotated in the direction of the arrow B in the same figure. In the beginning of said rotation the pin 33a of the arm 33 projecting from the toothed wheel 30 contacts the arm 55, which in unset position of the shutter occupies the position shown by dotted lines in Figure 6 and rotates the same back to its initial position (shown with full lines in the same figure), whereby the mirror 22 is swung to its operative position, in which it is automatically retained by the pawl 52. A dog 65 fixed to the arm 55 and, in unset position of the shutter, contacting a pin 66 fixed to the arm 44, serves to swing the last-mentioned arm 44 and consequently the guiding plate 7 back to the position shown in Figure 5. Near the end of this swinging movement of the arm 44 the pin 50 slides over an oblique surface 67 at the U-shaped pawl 46 which is imparted a swinging movement against the action of the spring 48 and finally occupies the position shown in Figure 5 thus again retaining the guiding plate 7 in set position. During this swinging movement of the guiding plate 7 the shutter plate 9 pushes the shutter plate 8 and the guiding plate 6 to the position shown in said figure in which position the guiding plate 6 is automatically retained by the pawl 59.

What I claim is:

A camera having a focal plane shutter comprising a camera box having a lens opening in one side thereof and a rectangular light opening, through which an emulsion surface may be exposed, formed in the wall of said box diametrically opposite to said lens opening, a lens mounted in said lens opening, a pair of shafts mounted in said box each along an opposite side of said light opening, a pair of substantially rectangular light obscuring guide plates each pivotally connected at one end to one of said shafts, a pair of light-obscuring substantially rectangular shutter plates each hingedly connected at one end to the free opposite end of one of said guide plates, a plurality of side plates each forming a substantially right angle triangle and having the base thereof mounted on a side of one of said shutter plates with the altitude thereof extending from the point of pivotal connection of its respective shutter plate towards the opposite shutter plate, a plurality of guide links with each link thereof pivotally connected at one end to the apex of a side plate and its opposite end to the one of said shafts supporting the opposite guide member and means for pivoting said guide plates when desired.

CURT WILHELM PETERSÉN.

REFERENCES CITED

The following references are of record in the file of this patent:

UNITED STATES PATENTS

| Number | Name | Date |
|---|---|---|
| 2,222,041 | Moomaw | Nov. 19, 1940 |
| 2,347,951 | Hunter | May 2, 1944 |